(12) United States Patent
Lin

(10) Patent No.: US 10,239,655 B1
(45) Date of Patent: Mar. 26, 2019

(54) QUANTITATIVE PRESSING STRUCTURE

(71) Applicant: Tsai-Hui Lin, Kaohsiung (TW)

(72) Inventor: Tsai-Hui Lin, Kaohsiung (TW)

( * ) Notice: Subject to any disclaimer, the term of this patent is extended or adjusted under 35 U.S.C. 154(b) by 0 days.

(21) Appl. No.: 15/862,847

(22) Filed: Jan. 5, 2018

(51) Int. Cl.
*B65D 5/76* (2006.01)
*B65D 83/38* (2006.01)
*B65D 83/00* (2006.01)

(52) U.S. Cl.
CPC ............. *B65D 5/76* (2013.01); *B65D 83/005* (2013.01); *B65D 83/0033* (2013.01); *B65D 83/38* (2013.01)

(58) Field of Classification Search
CPC ...... B65D 5/76; B65D 83/0033; B65D 83/38; B65D 83/005
USPC ....... 222/282, 384, 385, 321.2, 163, 153.13, 222/309
See application file for complete search history.

(56) References Cited

U.S. PATENT DOCUMENTS

| | | | | | |
|---|---|---|---|---|---|
| 2,022,208 | A | * | 11/1935 | Lacke | F04B 9/14 222/385 |
| 2,183,370 | A | * | 12/1939 | Selitzky | B67D 1/02 222/380 |
| 2,204,838 | A | * | 6/1940 | Walstrom | F04B 9/14 222/385 |
| 2,205,875 | A | * | 6/1940 | Coffey | G01F 11/028 222/309 |
| 4,869,404 | A | * | 9/1989 | Elliott | B05B 11/3015 222/380 |
| 5,375,746 | A | * | 12/1994 | Schaefer | B67D 7/0205 222/383.1 |
| 5,579,959 | A | * | 12/1996 | Bennett | A47G 19/183 222/385 |
| 5,833,669 | A | * | 11/1998 | Wyrick | A61M 5/31511 604/234 |
| 2009/0200341 | A1 | * | 8/2009 | Oden | B05B 11/3007 222/309 |

* cited by examiner

*Primary Examiner* — Lien M Ngo
(74) *Attorney, Agent, or Firm* — Rosenberg, Klein & Lee

(57) ABSTRACT

A quantitative pressing structure is disclosed herein. It comprises a pressing structure; an assembling seat disposed on the pressing structure for assembling at an opening of a container; a piston tube disposed at a bottom of the assembling seat and comprising a piston having a piston rod accommodated therein; a lid disposed at a top of the piston tube and having an outer casing protruded thereon and correspondingly disposed on a periphery of the piston rod, wherein an upper end of the piston rod of the piston penetrates the lid; a pressing portion disposed at a top of the piston rod; and a plurality of limiting kits having different heights for limiting a pressing down degree of the pressing portion, wherein each of the plurality of limiting kits has a slot for assembling on the outer casing of the lid.

8 Claims, 6 Drawing Sheets

QUANTITATIVE PRESSING STRUCTURE

BACKGROUND OF THE INVENTION

1. Field of the Invention

The present invention relates to provide a quantitative pressing structure which can accurately give a certain amount of liquid according to a user's demand by limiting a pressing down degree of a pressing portion so that the present invention has increased convenience in use and practicality of overall implementation.

2. Description of Related Art

Various containers used to store subjects in the market, especially for storing liquids of condiments for cooking, body washes, shampoos, or cosmetics, includes bottles, cans and others. In order to improve the convenience of use, the container is provided with a pressing structure to draw liquid out of the container.

Although the pressing structure can draw liquid out of the container by pressing a pressing head, it is also found that the pressing head can only be pressed to the bottom to allow a fixed amount of liquid to flow out. In other words, the amount of liquid flow cannot be arbitrarily and accurately controlled according to different requirements of use. If a user wants to take different amount of liquid, the user can only exert different pressing force on the pressing head of the pressing structure to control the pressing head to move down a different trip. However, this kind of pressing structure cannot achieve accurate control of liquid flow. A small or large pressing force that the user exerts on the pressing head may cause insufficient or excessive liquid to flow out, so the pressing structure still have many restrictions on the overall structural design that needs to be improved.

SUMMARY OF THE INVENTION

In view of the above-mentioned problems, the object of the present invention is to provide a quantitative pressing structure which comprising plural limiting kits having distinct rated flows to be replaced according to a user's demand for limiting a pressing down degree of a pressing portion of a pressing structure so as to accurately control an outflow of liquid, which increases convenience in use and practicality of overall implementation Disclosed herein is a quantitative pressing structure. It mainly comprises a pressing structure; an assembling seat disposed on the pressing structure for assembling at an opening of a container; a piston tube disposed at a bottom of the assembling seat and comprising a piston having a piston rod accommodated therein; a lid disposed at a top of the piston tube and having an outer casing protruded thereon and correspondingly disposed on a periphery of the piston rod, wherein an upper end of the piston rod of the piston penetrates the lid; a pressing portion disposed at a top of the piston rod; and a plurality of limiting kits having different heights for limiting a pressing down degree of the pressing portion, wherein each of the plurality of limiting kits has a slot at a bottom thereof corresponding to the outer casing of the lid for assembling to the outer casing of the lid and further limiting a pressing down degree of the pressing portion.

According to an embodiment of the present invention, the assembling seat is provided with a first assembling hole for connecting the top of the piston tube and a second assembling hole. The piston rod is provided with an upper supporting piece at the upper end thereof, a lower supporting piece at a lower end thereof, and a pushing tube on the upper supporting piece for passing through the outer casing of the lid. A supporting portion is disposed between the lower supporting piece and an inner edge of the piston tube. An elastic member is disposed between the upper supporting piece and the lower supporting piece. The piston tube is connected with a connection piece at a bottom thereof. The connection piece is provided with a guiding channel communicated with the piston tube, a guiding hole disposed at a bottom of the guiding channel, a first ball disposed below a first limit piece fixed in the guiding channel for rolling up and down between the first limit piece and the guiding hole and rolling down to plug in the guiding hole, a communicating channel transversely connected to the guiding channel, an importing channel connected to the communicating channel at a lower end thereof and a connecting duct at an upper end thereof and having an importing hole formed at a junction of the communicating channel and the importing channel, and a second ball below a second limit piece fixed in the importing channel for rolling up and down between the second limit piece and the importing hole and rolling down to plug in the importing hole. The connecting duct is connected with an outflow duct at an upper end thereof. The outflow duct is protruded from the second assembling hole of the assembling seat and has an outflow port at an outer end thereof.

According to an embodiment of the present invention, the guiding hole of the connection piece is formed with a first inner arc line at an inner end thereof to increase an anti-leak effect of the first ball.

According to an embodiment of the present invention, the importing hole of the connection piece is formed with a second inner arc line at an inner end thereof to increase an anti-leak effect of the second ball.

According to an embodiment of the present invention, the outflow port of the outflow duct is sleeved with a limiting ring to prevent liquid remaining in the outflow duct leaking from the outflow port.

According to an embodiment of the present invention, the first limit piece is a pin.

According to an embodiment of the present invention, the second limit piece is a pin.

According to an embodiment of the present invention, the importing channel is formed with an exporting hole having a tapering shape.

DETAILED DESCRIPTION OF THE PREFERRED EMBODIMENT

Hereinafter, an exemplary embodiment of the present invention will be described in detail with reference to the accompanying drawings.

Figure 1:
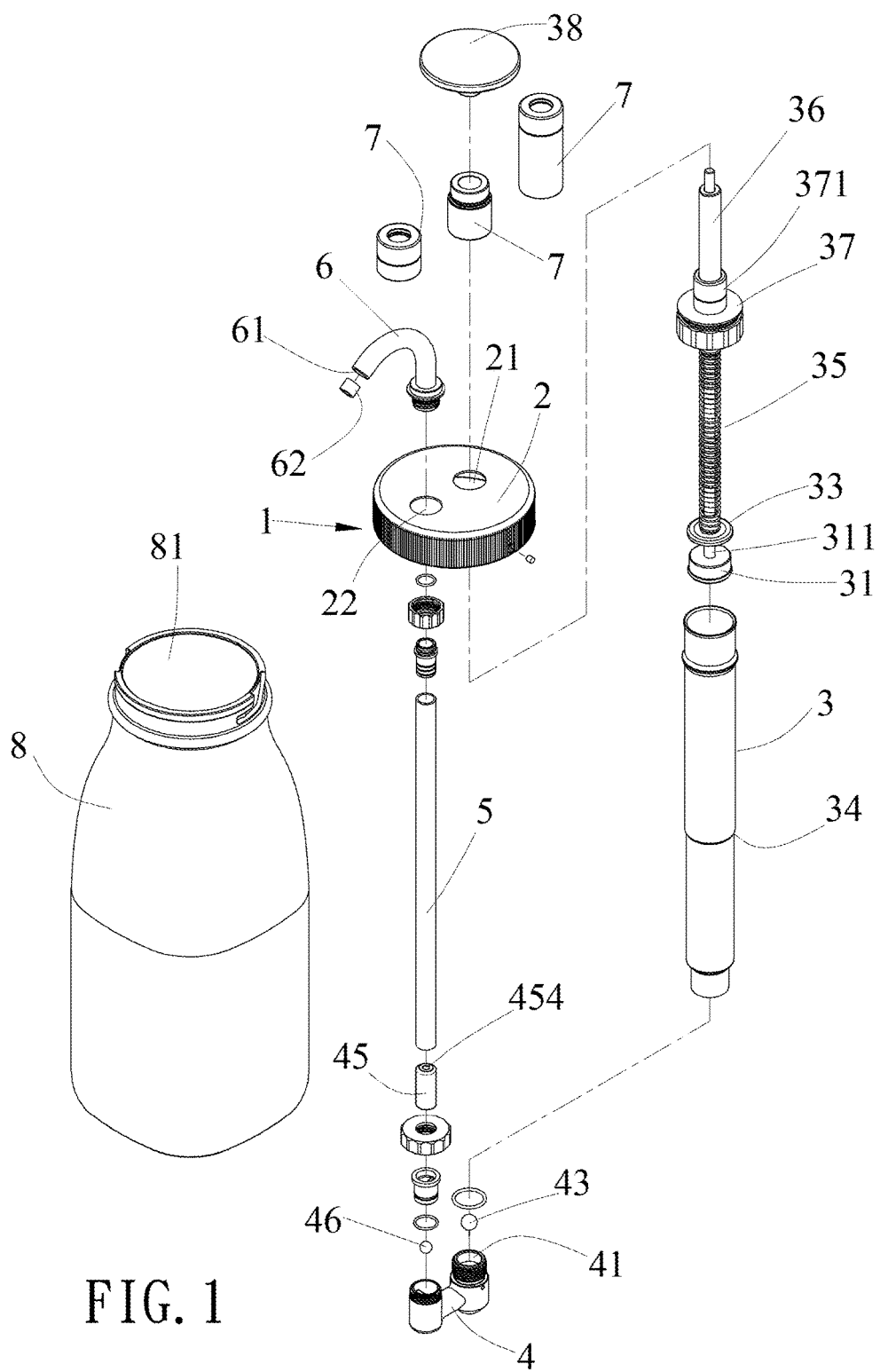
FIG. 1 is an explosion diagram showing a quantitative pressing structure according to the present invention.
Figure 2:
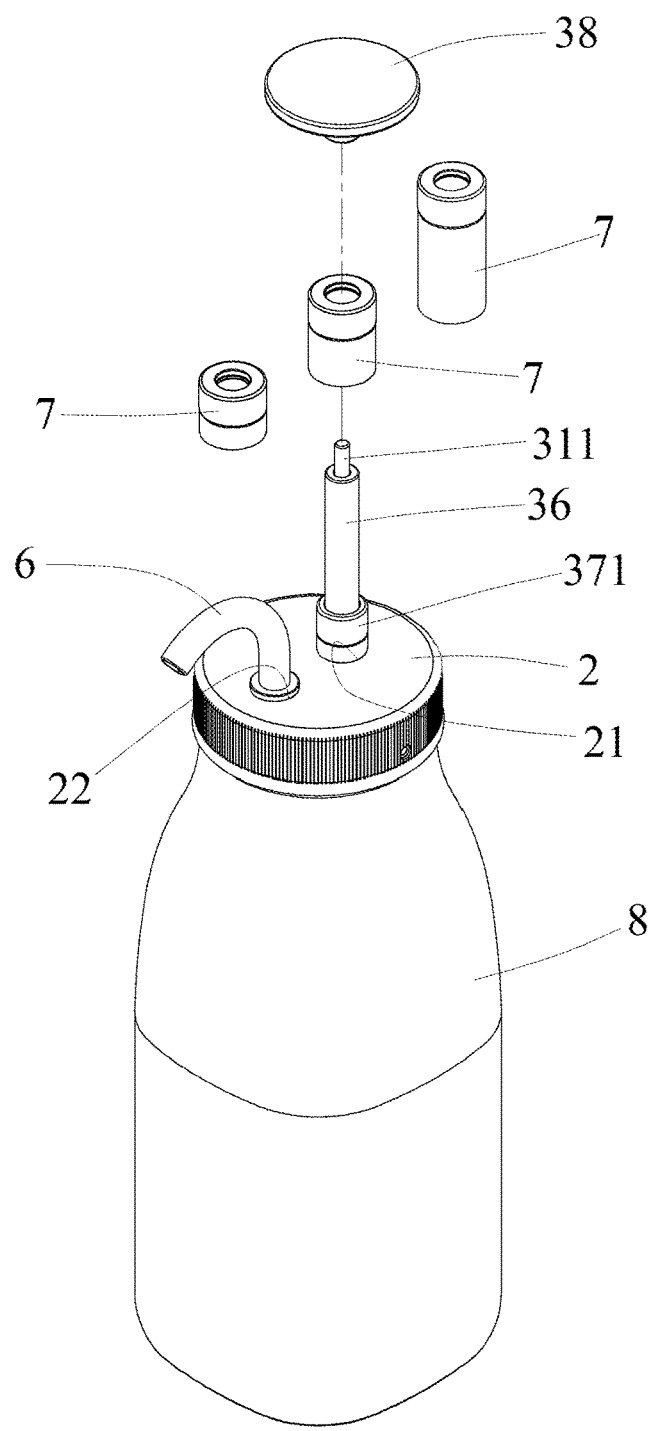
FIG. 2 is a partial explosion diagram showing a quantitative pressing structure according to the present invention.
Figure 3:
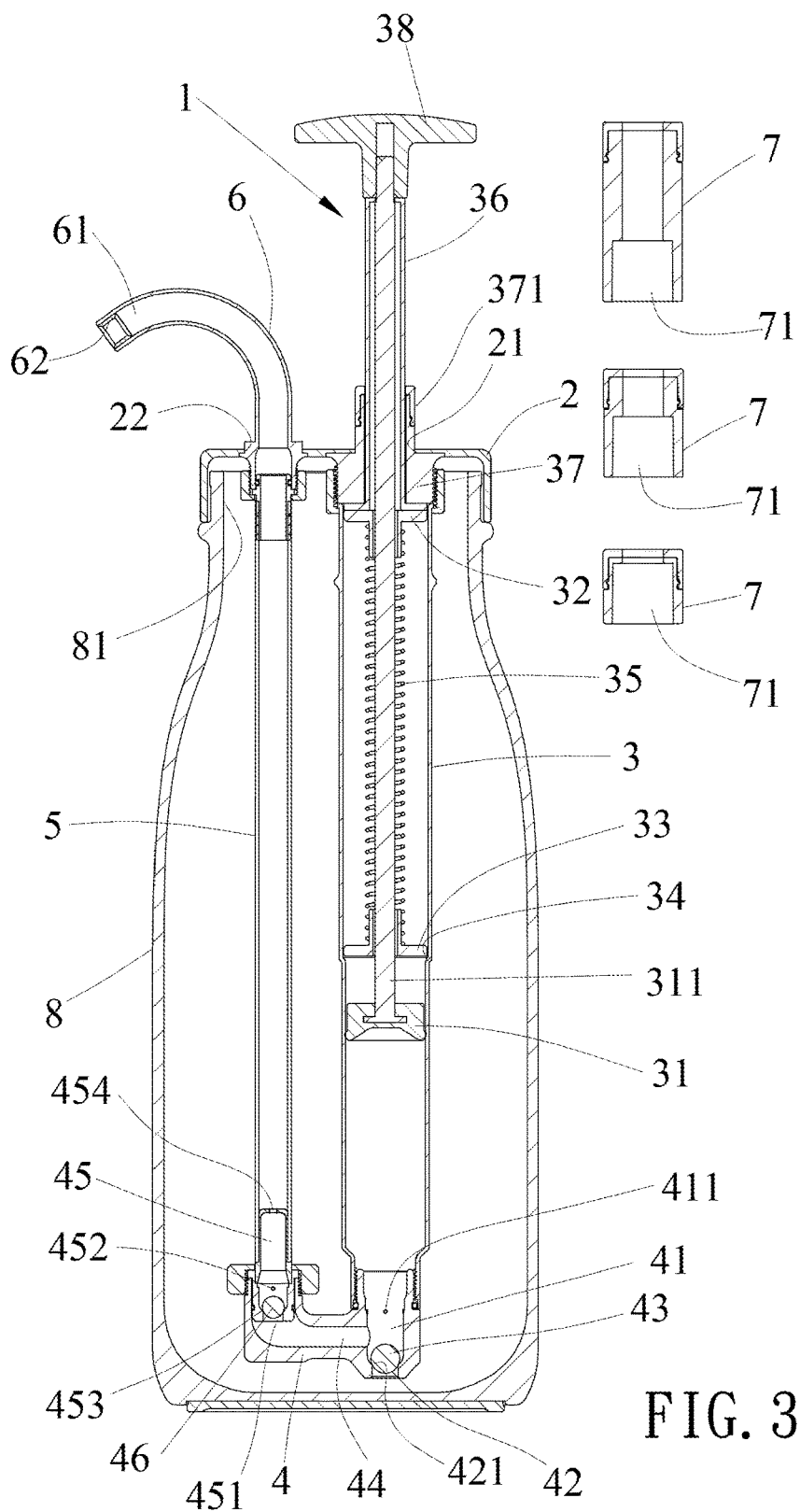
FIG. 3 is a cross-sectional view showing a quantitative pressing structure according to the present invention.

As showed in FIG. 1, FIG. 2 and FIG. 3, an exploded diagram, a partial explosion diagram, and a cross-sectional view showing a quantitative pressing structure according to the present invention are respectively disclosed.

The quantitative pressing structure comprises a pressing structure (1), an assembling seat (2), a piston tube (3), a lid (37), a pressing portion (38), and a plurality of limiting kits (7).

The assembling seat (2) is disposed on the pressing structure (1) and has a first assembling hole (21) and a second assembling hole (22).

The piston tube (3) disposed at a bottom of the first assembling hole (21) of the assembling seat (2) and comprises a piston (31) accommodated in the piston tube (3), and the piston (31) has a piston rod (311) extended from an upper end of the piston (31). The piston rod (311) is provided with an upper supporting piece (32) at the upper end thereof and a lower supporting piece (33) at a lower end thereof. A supporting portion (34) is disposed between the lower supporting piece (33) and an inner edge of the piston tube (3). An elastic member (35) is disposed between the upper supporting piece (32) and the lower supporting piece (33). The piston rod (311) is further connected with a pushing tube (36) on the upper supporting piece (32) for passing through an outer casing (371) protruded from the lid (37), and the pushing tube (36) is connected to the pressing portion (38).

The piston tube (3) is connected with a connection piece (4) at a bottom thereof. The connection piece (4) comprises a guiding channel (41) communicated with the piston tube (3), a guiding hole (42) disposed at a bottom of the guiding channel (41), a first ball (43) disposed below a first limit piece (411) fixed in the guiding channel (41) for rolling up and down between the first limit piece (411) and the guiding hole (42) and rolling down to plug in the guiding hole (42), a communicating channel (44) transversely connected to the guiding channel (41), an importing channel (45) connected to the communicating channel (44) at a lower end thereof and a connecting duct (5) at an upper end thereof and having an importing hole (451) formed at a junction of the communicating channel (44) and the importing channel (45), and a second ball (46) below a second limit piece (452) fixed in the importing channel (45) for rolling up and down between the second limit piece (452) and the importing hole (451) and rolling down to plug in the importing hole (451). Preferably, the first limit piece (411) and the second limit piece (452) are pins. An inner end of the guiding hole (42) is formed with a first inner arc line (421) to increase an anti-leak effect of the first ball (43), and an inner end of the importing hole (451) is formed with a second inner arc line (453) to increase an anti-leak effect of the second ball (46). The upper end of the importing channel (45) is formed with an exporting hole (454) having a tapering shape.

The connecting duct (5) is connected with an outflow duct (6) at an upper end thereof. The outflow duct (6) is protruded from the second assembling hole (22) of the assembling seat (2), and an outer end of the outflow duct (6) is provided with an outflow port (61). The outflow port (61) of the outflow duct (6) is further sleeved with a limiting ring (62) to prevent liquid remaining in the outflow duct (6) leaking from the outflow port (61).

The plurality of limiting kits (7) have different heights. A bottom of each of the plurality of limiting kits (7) has a slot (71) corresponding to the outer casing (371) of the lid (37) of the piston tube (3) for assembling to the outer casing (371) of the lid (37) and further limiting a pressing down degree of the pressing portion (38).

Figure 4:
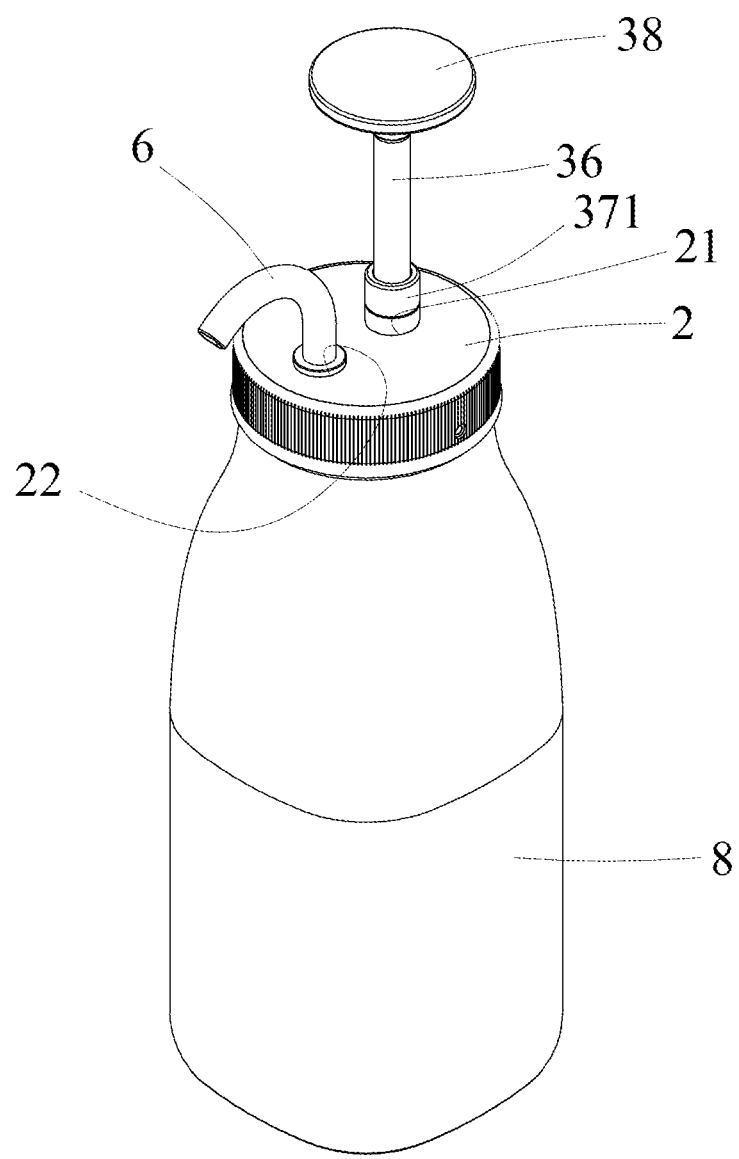
FIG. 4 is a stereogram showing a quantitative pressing structure according to the present invention.
Figure 5:
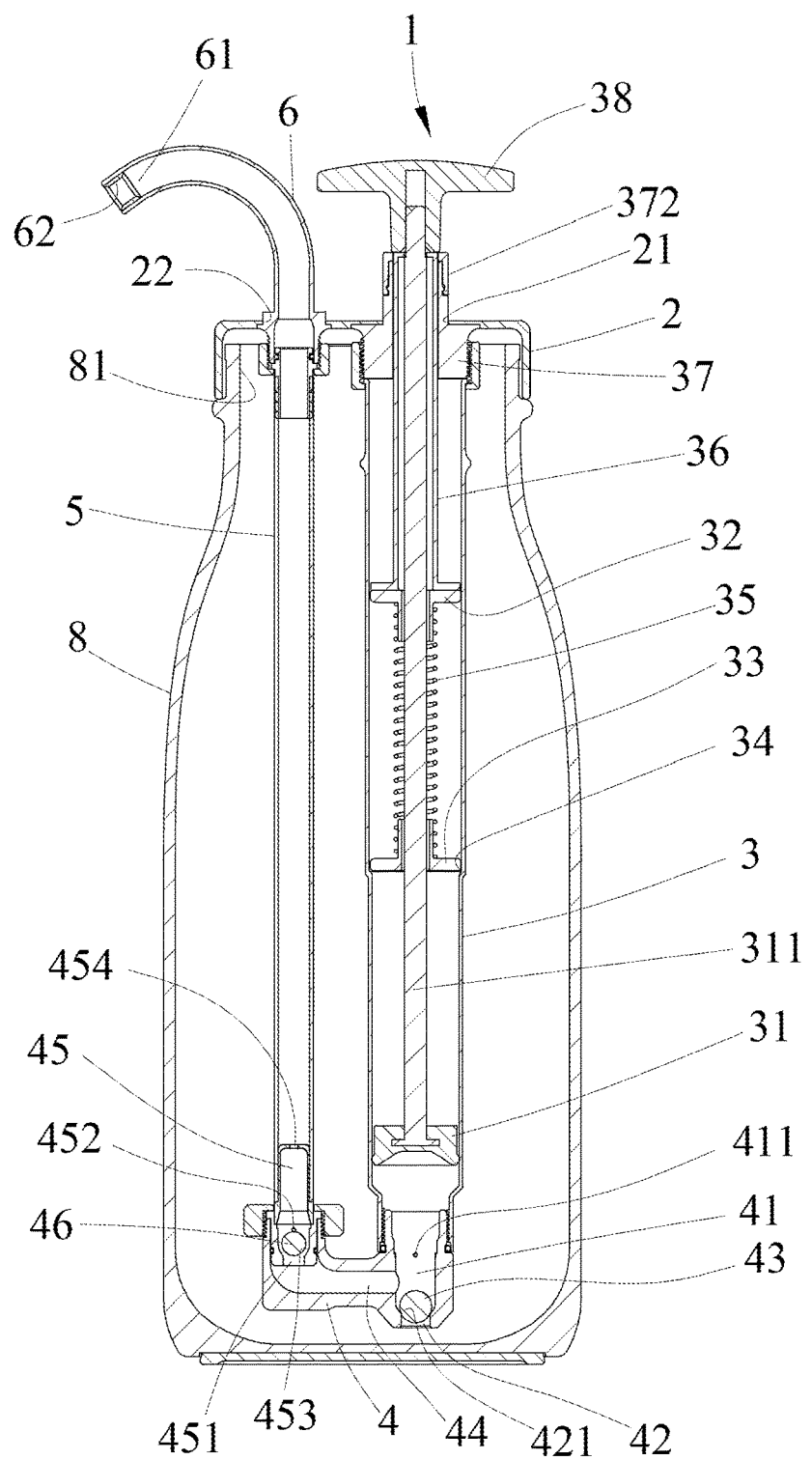
FIG. 5 is a cross-sectional view showing a first embodiment of a quantitative pressing structure in use according to the present invention.

In an actual use of the quantitative pressing structure of the present invention, the pressing structure (1) is assembled to an opening (81) of a container (8) by the assembling seat (2). Referring to FIG. 4 and FIG. 5, if a user wand to take out liquid accommodated in the container (8), the use can press the pressing portion (38) downwards to drive the piston rod (311) together with the pushing tube (36) to move downwards. In such a case, the pushing tube (36) pushes the upper supporting piece (32) to compress the elastic member (35). At the same time, the liquid in the piston tube (3) pushed by the piston rod (311) and the piston (31) moving downwards further flows into the guiding channel (41) of the connection piece (4) and pushes the first ball (43) downwards to plug in the guiding hole (42). After the guiding hole (42) is plugged, the liquid cannot continue to flow downwards and can only flows from the guiding channel (41) into the communicating channel (44) and the importing channel (45) for further pushing the second ball (46) upwards, so the liquid flows into the connecting duct (5) from the exporting hole (454) of the importing channel (45), passes through the outflow duct (6), and finally flows out of the container (8) from the outflow port (61) of the outflow duct (6). The exporting hole (454) has a tapering shape, and a diameter of the exporting hole (454) is less than a diameter of the connecting duct (5). Therefore, when the liquid flows from the exporting hole (454) having a smaller diameter into the connecting duct (5) having a larger diameter, flow velocity of the liquid is decreased, which prevent the liquid being rapidly spouted at a large angle from the outflow port (61) of the outflow duct (6) and contaminating the surrounding environment. Furthermore, diameter of the exporting hole (454) can be adjusted to change an outflow angle and flow velocity of the liquid flowing out of the outflow port (61).

When the user is no longer pressing the pressing portion (38), the elastic member (35) rebounds to push the upper supporting piece (32) together with the pushing tube (36) upwards, which also drives the pressing portion (38) together with the piston rod (311) to move upwards. In such a case, the piston rod (311) pulls the piston (31) in the piston tube (3), which causes a negative pressure in the piston tube (3). Thus, the second ball (46) is guided to the importing hole (451) by the negative pressure and then rolls down to plug in the importing hole (451). At the same time, the first ball (43) move upwards and leave the guiding hole (42), allowing the liquid accommodated in the container (8) to flow from the guiding hole (42) into the piston tube (3) for storage.

Figure 6:
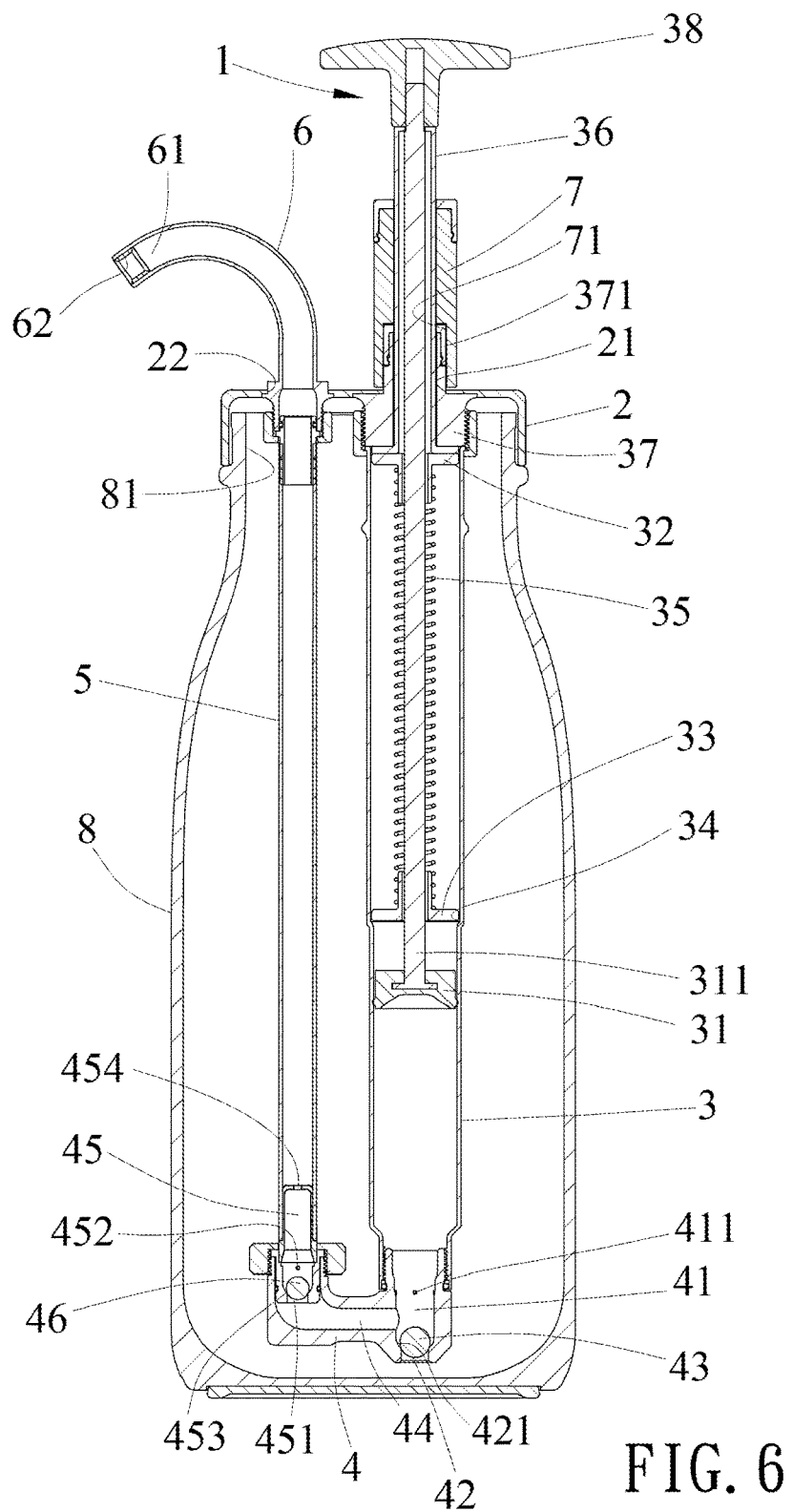
FIG. 6 is a cross-sectional view showing a second embodiment of a quantitative pressing structure in use according to the present invention.

Referring to FIG. 6, if the user want to change different amount of liquid to flow out of the outflow port (61) of the outflow duct (6), the limiting kit (7) on the slot (71) can be replaced with a limiting kit (7) having different height by taking off the pressing portion (38) at the top end of the piston rod (311), assembling the limiting kit (7) having different height to the outer casing (371) of the lid (37), and assembling the pressing portion (38) back to the piston rod (311). Accordingly, when the user presses the pressing portion (38), the pressing down degree of the pressing portion (38) is limited by the limiting kit (7) during the pressing down of the piston rod (311) along with the pushing tube (36) by the pressing portion (38), so the piston (31) is limited to push the liquid in the piston tube (3) and the amount of the liquid flowing out of the outflow port (61) of the outflow duct (6) is changed.

Compared with the technique available now, the present invention has the following advantages:

1. The plural limiting kits having distinct rated flows of the present invention can be replaced according to a user's demand for limiting the pressing down degree of the pressing portion so as to accurately control an outflow of fluid, which increases convenience in use and practicality of overall implementation.

2. The piston rod of the piston in the piston tube is provided with the upper supporting piece and the lower supporting piece, and the elastic member is disposed between the upper supporting piece and the lower supporting piece, so the piston can be pushed back to its original position by the elastic member after it is pressed and avoids contact of the elastic member with the liquid. Therefore, the present invention prevents the elastic member from contaminating the fluid and avoids suspicion of sanitary problems in use.

3. The outflow duct of the present invention has the limiting ring at the inner edge of the outflow port, which prevents the liquid remaining in the outflow duct leaking from the outflow port.

4. The overall structure of the present invention can be disassembled and assembled easily, and it is also easy to clean after disassembly, so the present invention achieves efficacy of simplicity and convenience in the overall use.

What is claimed is:

1. A quantitative pressing structure, comprising:
    a pressing structure;
    an assembling seat disposed on the pressing structure for assembling at an opening of a container;
    a piston tube disposed at a bottom of the assembling seat and including a piston having a piston rod accommodated therein;
    a lid disposed at a top of the piston tube and having an outer casing protruding therefrom and correspondingly disposed about a periphery of the piston rod, wherein the piston rod of the piston penetrates the lid;
    a pressing portion removably coupled to a top of the piston rod; and
    a plurality of alternatively selectable limiting kits having different heights for limiting a pressing down degree of the pressing portion, different ones of the limiting kits being selectively placed and replaced about the piston rod upon removal of the pressing portion from the piston rod, wherein each of the plurality of limiting kits includes a bottom portion forming a concave slot configured to receive the outer casing of the lid in conformed manner, a selected one of the limiting kits thereby adjustably limiting a pressing down degree of the pressing portion.

2. The quantitative pressing structure claimed in claim 1, wherein the assembling seat is provided with a first assembling hole for connecting the top of the piston tube and a second assembling hole; wherein the piston rod is provided with an upper supporting piece at an upper end thereof, a lower supporting piece at a lower end thereof, and a pushing tube on the upper supporting piece for passing through the outer casing of the lid; a supporting portion disposed between the lower supporting piece and an inner edge of the piston tube; an elastic member disposed between the upper supporting piece and the lower supporting piece; the piston tube connected with a connection piece at a bottom thereof; the connection piece having a guiding channel communicated with the piston tube, a guiding hole disposed at a bottom of the guiding channel, a first ball disposed below a first limit piece fixed in the guiding channel for rolling up and down between the first limit piece and the guiding hole and rolling down to plug in the guiding hole, a communicating channel transversely connected to the guiding channel, an importing channel connected to the communicating channel at a lower end thereof and a connecting duct at an upper end thereof and having an importing hole formed at a junction of the communicating channel and the importing channel, and a second ball below a second limit piece fixed in the importing channel for rolling up and down between the second limit piece and the importing hole and rolling down to plug in the importing hole; the connecting duct connected with an outflow duct at an upper end thereof; and wherein the outflow duct protruded from the second assembling hole of the assembling seat and having an outflow port at an outer end thereof.

3. The quantitative pressing structure claimed in claim 2, wherein the guiding hole of the connection piece is formed with a first inner arc line at an inner end thereof to increase an anti-leak effect of the first ball.

4. The quantitative pressing structure claimed in claim 2, wherein the importing hole of the connection piece is formed with a second inner arc line at an inner end thereof to increase an anti-leak effect of the second ball.

5. The quantitative pressing structure claimed in claim 2, wherein the outflow port of the outflow duct is sleeved with a limiting ring to prevent liquid remaining in the outflow duct leaking from the outflow port.

6. The quantitative pressing structure claimed in claim 2, wherein the first limit piece is a pin.

7. The quantitative pressing structure claimed in claim 2, wherein the second limit piece is a pin.

8. The quantitative pressing structure claimed in claim 2, wherein the importing channel is formed with an exporting hole having a tapering shape.

\* \* \* \* \*